(12) United States Patent
Goetz (10) Patent No.: US 11,185,155 B2
(45) Date of Patent: Nov. 30, 2021

(54) ROTARY BRUSH WASHING APPARATUS AND METHOD

(71) Applicant: John Bean Technologies Corporation, Chicago, IL (US)

(72) Inventor: Robert R. Goetz, Garden Grove, CA (US)

(73) Assignee: John Bean Technologies Corporation, Chicago, IL (US)

( * ) Notice: Subject to any disclaimer, the term of this patent is extended or adjusted under 35 U.S.C. 154(b) by 218 days.

(21) Appl. No.: 16/394,230

(22) Filed: Apr. 25, 2019

(65) Prior Publication Data

US 2019/0246786 A1 Aug. 15, 2019

Related U.S. Application Data

(62) Division of application No. 15/061,968, filed on Mar. 4, 2016, now Pat. No. 10,278,489.

(51) Int. Cl.
*A46B 17/06* (2006.01)
*A23N 12/02* (2006.01)
*A46B 13/00* (2006.01)

(52) U.S. Cl.
CPC ............ *A46B 17/065* (2013.01); *A23N 12/02* (2013.01); *A46B 13/001* (2013.01); *A46B 17/06* (2013.01)

(58) Field of Classification Search
CPC .... A23N 12/02; A46B 17/065; A46B 13/001; A46B 17/06
USPC ..................................................... 134/6, 198
See application file for complete search history.

(56) References Cited

U.S. PATENT DOCUMENTS

| 3,835,869 | A | 9/1974 | Newman et al. |
| 3,982,296 | A | 9/1976 | Russo |
| 4,702,777 | A | 10/1987 | Kuhl |
| 5,259,890 | A | 11/1993 | Goff |
| 5,507,060 | A | 4/1996 | Quimpo |
| 5,701,626 | A | 12/1997 | Zara et al. |
| 5,875,800 | A | 3/1999 | Hulskotte |
| 7,594,291 | B1 | 9/2009 | Carmen |

(Continued)

FOREIGN PATENT DOCUMENTS

| EP | 2364613 A2 | 9/2011 |
| WO | 02/076639 A1 | 10/2002 |

(Continued)

OTHER PUBLICATIONS

International Preliminary Report on Patentability dated Sep. 13, 2018, issued in corresponding International Application No. PCT/US2017/020663, filed Mar. 3, 2017, 8 pages.

(Continued)

*Primary Examiner* — Tinsae B Ayalew
(74) *Attorney, Agent, or Firm* — Christensen O'Connor Johnson Kindness PLLC (57) ABSTRACT

A method and apparatus for washing and sanitizing elongate rotary brushes used for cleaning fruit, produce, and other food products includes revolving the brushes along a travel path about a housing (14) and simultaneously spinning the rotary brushes about their individual longitudinal axis (18), applying a cleaning solution to the spinning rotary brushes in a cleaning zone of the housing, then applying a spray to the spinning rotary brushes in a spray zone of the housing.

18 Claims, 7 Drawing Sheets

(56) References Cited

U.S. PATENT DOCUMENTS

| | | | |
|---|---|---|---|
| 2002/0166578 A1* | 11/2002 | Leblond | B08B 3/045 |
| | | | 134/99.2 |
| 2003/0024554 A1 | 2/2003 | Schultz et al. | |
| 2004/0211446 A1 | 10/2004 | Schultz et al. | |
| 2008/0105274 A1 | 5/2008 | Kennedy | |
| 2017/0167658 A1 | 6/2017 | Goetz | |

FOREIGN PATENT DOCUMENTS

| | | |
|---|---|---|
| WO | 2005/046389 A1 | 5/2005 |
| WO | 2010/035290 A1 | 4/2010 |

OTHER PUBLICATIONS

International Search Report and Written Opinion dated May 19, 2017, issued in corresponding International Application No. PCT/US2017/020663, filed Mar. 3, 2017, 12 pages.
Search Report and Written Opinion dated Feb. 7, 2020, in Chilean Application No. 17711498.0, filed Mar. 3, 2017, with partial English translation provided by foreign associate, 12 pages.
Communication Pursuant to Article 94(3) EPC dated Oct. 30, 2020, issued in European Application No. 17711498.0, filed Mar. 3, 2017, 5 pages.

* cited by examiner

ROTARY BRUSH WASHING APPARATUS AND METHOD

CROSS-REFERENCE TO RELATED APPLICATION

This application is a division of U.S. patent application Ser. No. 15/061,968, filed Mar. 4, 2016, the disclosure of which is hereby incorporated by reference herein in its entirety.

BACKGROUND

After produce, fruits and other types of food items are picked or otherwise harvested, they are commonly cleaned utilizing processing machines filled with roller brushes. The brushes are mounted horizontally on the machine side-by-side to each other in close proximity, thereby to cooperatively form a bed of brushes on which the produce, fruit or other food items travel while being cleaned by the rotating brushes. As safety in food processing becomes more strict, there is an increasing need and requirement to clean all equipment surfaces and components that touch the food items during processing.

The roller brushes become dirty from the produce, fruit or other food products being cleaned and moving across the brushes, causing the brushes to trap, dirt, debris, and other materials and organisms in the brush filaments and in the brush cores. The brushes are difficult to access for cleaning when installed in a cleaning machine due to guards as well as systems needed to drive or turn the brushes. Thus, the brushes need to be removed from the processing machine for cleaning and sanitization. Typically, the removed brushes are washed manually one at time with a water hose or soaked in a tray until the brushes are visibly clean. Consistent and thorough cleaning is difficult to achieve using these methods and effective sanitization of the brushes unlikely.

The present disclosure addresses the need for an efficient and effective apparatus and system for cleaning rotary produce/fruit/food brushes.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A washing machine cleans and sanitizes cylindrical brushes used for scrubbing produce, fruit, and other food items. The brushes are loaded into the washing machine and subjected to a cycle of cleaning and sanitization within the machine. Once the cleaning/sanitization cycle has been completed, the brushes are easily removed from the washing machine and reinstalled in the in-line processing equipment from which the brushes were removed. The washing machine is constructed with internal zones through which each brush is carried by a carrier system that enables each brush, including its filaments and core, to be exposed for adequate cleaning and sanitization. The rotary brush mounting arrangement facilitates the effective removal of dirt, debris, and organisms during the cleaning cycle. The machine's design enables the brushes to be easily loaded and unloaded from the machine. In addition to efficiently and consistently cleaning the rotary brushes, the brushes are also sanitized in an efficient and consistent manner, which is not readily achievable when manually washing the rotary brushes one at a time.

A rotary brush washing machine in accordance with the foregoing attributes includes:

a housing;

a carrier assembly positioned within the housing for supporting a plurality of rotary brushes for revolving about the housing and simultaneously spinning about the individual axes of the rotary brushes;

a cleaning solution applicator for applying cleaning solution on the rotary brushes as the brushes revolve about the housing and simultaneously spin about their individual longitudinal axis; and a sprayer for applying spray on the rotary brushes for removing particulate matter from the rotary brushes as the rotary brushes revolve about the housing and simultaneously spin about their individual longitudinal axis.

In a further aspect, the carrier assembly for the rotary brush washing apparatus includes:

an upper carrier substructure for carrying and supporting the upper end portions of the rotary brushes as the rotary brushes revolve about the housing and rotate about their individual longitudinal axis;

a lower carrier substructure for carrying and supporting the lower end portions of the rotary brushes as the rotary brushes revolve about the housing and spin about their individual longitudinal axis; and a first drive for simultaneously driving in unison the upper and lower carrier substructures to revolve the rotary brushes about the housing.

The rotary brush washing apparatus further includes a second drive, which operates independently of the first drive, for spinning the individual rotary brushes about the longitudinal axes of the individual brushes at a speed unrelated to the speed at which the upper and lower carrier substructures revolve the rotary brushes about the housing.

As a further aspect, the housing is generally circular in shape to define a central axis, and the carrier assembly supports the rotary brushes for rotation about the central axis of the housing. In addition, the upper and lower substructures are in the form of upper and lower annular ring structures that support the rotary brushes for circular rotation about the central axis of the housing.

In accordance with a further aspect of the present disclosure, the housing is divided into separate zones where different steps of the brush cleaning and sanitation process occur. In this regard, there may be a zone for applying a wetting liquid to the rotary brushes, a zone for applying a cleaning solution to the rotary brushes, a zone for applying a spray to the rotary brushes, and/or a zone for applying a sterilizing or sanitizing solution to the rotary brushes.

In addition to providing a washing apparatus for washing and sanitizing rotary brushes, a method is provided for removing particulate matter from the rotary brushes. The method includes:

revolving the rotary brushes along a path within the interior of a housing;

simultaneously spinning the rotary brushes about the individual longitudinal axes of the rotary brushes;

passing the revolving and spinning rotary brushes through a cleaning solution application zone to apply a cleaning solution to the rotary brushes; and passing the rotary brushes through a spraying zone to apply a spray to the rotary brushes.

The method may also include passing the brushes through a wetting zone to apply a wetting solution to the rotary brushes prior to passing the brushes through a cleaning solution application zone.

The method may also include passing the rotary brushes through a sanitizing zone to apply to the rotary brushes.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 7 and 8 are enlarged fragmentary views of the engagement of the upper ends of a brush with the washing machine apparatus, wherein FIG. 8 is a view wherein the mounting structure for the brush is rotated 90° from FIG. 7.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "upward," "downward," "right hand," "left hand," "in," "out," "extended," "advanced," "retracted," "proximal," and "distal." These references and other similar references in the present application are only to assist in helping describe and understand the present invention and are not intended to limit the present invention to these directions.

The present application may include modifiers such as the words "generally," "approximately," "about", or "substantially." These terms are meant to serve as modifiers to indicate that the "dimension," "shape," "temperature," or other physical parameter, in question need not be exact, but may vary as long as the function that is required to be performed can be carried out. For example, in the phrase "generally circular in shape," the shape need not be exactly circular as long as the required function of the structure in question can be carried out.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units are the same or similar are not repeated so as to avoid redundancy in the present application.

Figure 1:
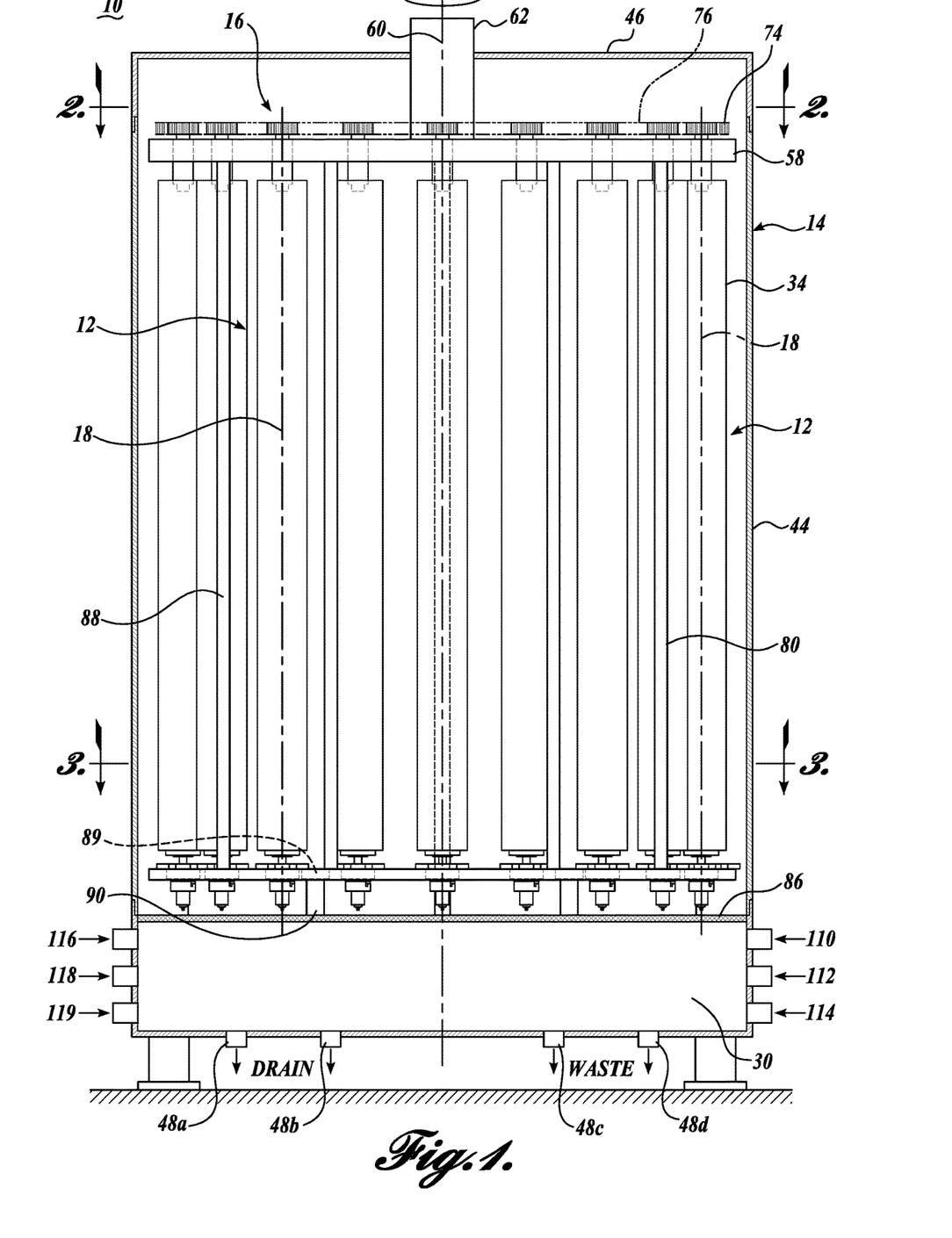
FIG. 1 is a side elementary view, partially in section, of the brush washing machine apparatus of the present disclosure.
Figure 2:
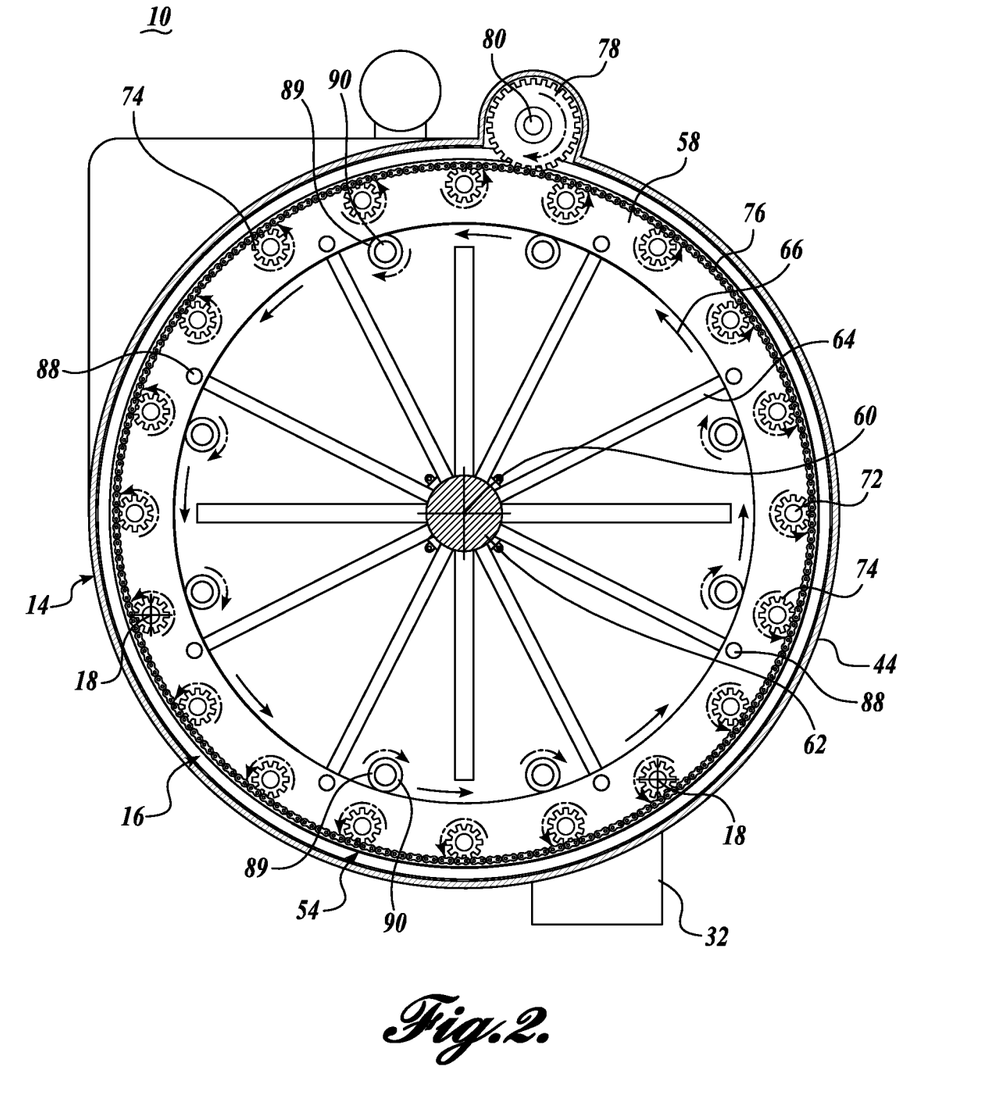
FIG. 2 is a top sectional view of FIG. 1 taken along lines 2-2 thereof.
Figure 3:
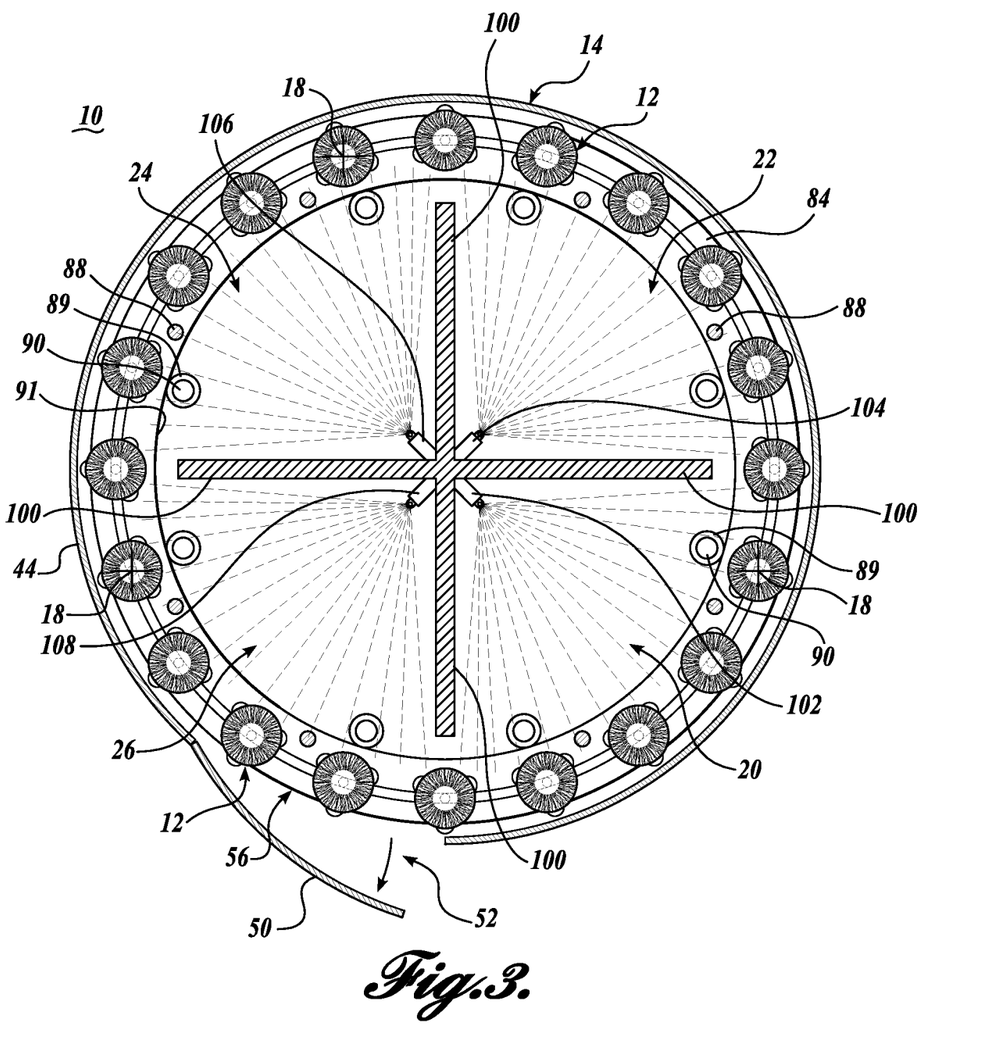
FIG. 3 is a further sectional view of FIG. 1 taken along lines 3-3 thereof.
Figure 5:
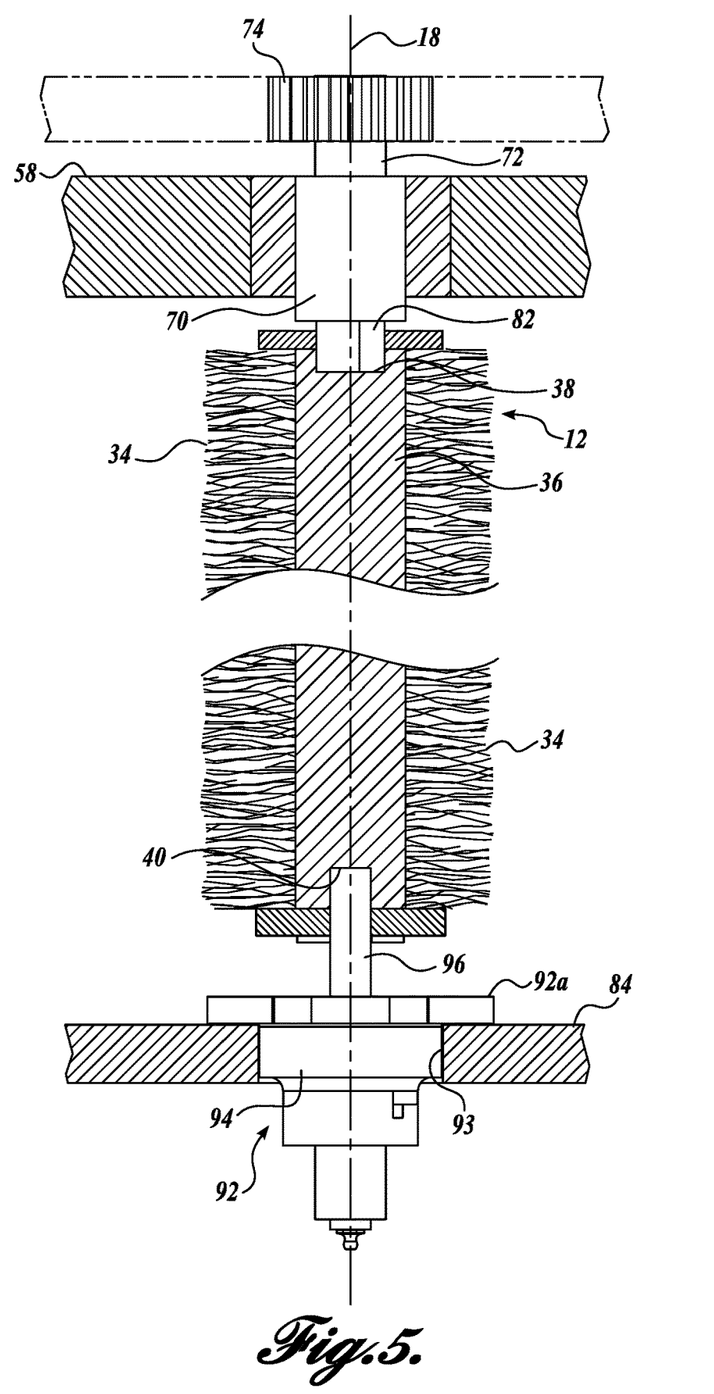
FIG. 5 is an enlarged fragmentary view of the engagement of the upper and lower ends of a brush with the washing machine apparatus.

The present disclosure pertains to a washing machine apparatus 10 for washing and sanitizing roller brushes, such as elongate roller brushes 12, shown in FIGS. 1 and 5, used for cleaning produce, fruit and other types of food products. In basic form, the washing machine 10 includes a cylindrical housing 14 within which is installed a carrier assembly 16 for supporting the rotary brushes 12 to revolve about the interior perimeter of the housing and also simultaneously spin the individual rotary brushes about their individual longitudinal axis 18. As shown in FIG. 3, the interior of the housing is divided into zones 20, 22, 24, and 26 at which different steps in the cleaning and sanitization process are carried out. A collection tank 30 is located at the bottom of the housing 14 to collect waste fluids and other effluent from the cleaning and sanitization process. A control panel 32, shown in FIG. 2, is used to program the washing machine 10 to a desired washing and sanitization cycle, which can be tailored to the condition of the brushes being cleaned and sanitized.

The above general components of washing machine 10 are described more fully below, as well as other components and features of the washing machine.

Referring to the figures, the brushes 12 are of an elongate configuration having bristles 34 radiating outwardly from a central core 36. At the upper end of the brushes, a square shaped socket 38 is formed in the central core 36 for engagement with the carrier assembly 16. At the bottom end of the brush 12, a circular blind hole 40 is formed in the core 36 for engagement with the carrier assembly. Although one configuration of brushes 12 is illustrated and described, the present washing machine 10 is not limited to cleaning brushes of only this particular configuration. The washing machine can be utilized to clean other constructions of brushes, including brushes having different upper and lower end configurations. To this end, the carrier assembly of machine 10 can be adapted to correspond with/accommodate other brush designs.

The housing 14 is illustrated as being circular in shape and having a cylindrical drum or body portion 44 covered by a top 46. The body 44 is positioned above the bottom collection tank 30. The top 46 is removable to gain access to the interior of the housing. Drains 48a, 48b, 48c, and 48d are provided at the bottom of the collection tank 30 for removal of the used/waste fluids from the tank. As discussed below, the housing is divided into various zones, and the tank 30 likewise could be divided into corresponding zones by partitions, not shown. As such, drains 48*a*, 48*b*, 48*c*, and 48*d* can be located in each of the different partition zones.

This housing body 44 includes a door 50 that provides access to the interior of the housing through opening 52. As described below, the brushes 12 are conveniently loaded into the machine 10 and removed from the machine through opening 52.

Although the housing 14 is found in configuration so as to correspond to the shape of the rotatable carrier assembly 16, the housing 14 can be constructed in other shapes, such as rectangular, oval, elliptical, etc., especially if the brushes 12 are mounted on a carrier assembly that is able to revolve the brushes around the interior perimeter of the rectangular, oval, elliptical, etc., shaped housing.

The carrier assembly 16 includes an upper carrier substructure 54 for carrying and supporting the upper end portions of the brushes 12 as the brushes revolve around the housing 14 and spin about their individual axis 18. The carrier assembly 16 correspondingly includes a lower carrier substructure 56 for carrying and supporting the lower end portions of the rotary brushes as the rotary brushes revolve around the housing 14 and spin about individual axis 18. Referring specifically to FIGS. 1 and 2, the upper carrier substructure 54 includes an upper annular ring 58 that has an outer diameter spaced a short distance inwardly from the inner circumference of the housing body 44. The annular ring 58 is carried and supported for rotation about the central axis 60 of the housing 14 by a powered shaft 62 extending downwardly into the housing 14 through a clearance hole formed in the top 46. The upper annular ring 58 is connected to the powered shaft 62 by a series of radial spokes 64 extending radially outwardly from shaft 62 to intersect with the upper annular ring 58. The powered shaft 62 rotates the annular ring 58 in the direction of arrows 66 shown in FIG. 2.

Referring additionally to FIG. 5, the interconnection between the upper end portion of the brush 12 and the upper carrier substructure 54 is illustrated. In this regard, at the location of each brush 12 a shaft 70 is anti-frictionally mounted on ring 58 so as to rotate relative therethrough. The upper end of shaft 70 has a reduced diameter shank portion 72 that engages securely within the interior of a chain sprocket 74. As shown in FIG. 2, the sprocket 74 at each brush location is interconnected by a chain 76 that engages with the sprocket teeth along the circumferentially outwardly directed portions of the sprockets 74. The chain 76 is driven by a drive sprocket 78 which is rotated by a powered shaft 80. The shaft is connected to a rotational actuator, for example, an electric motor, hydraulic motor, air motor, etc. (not shown).

Referring back to FIG. 5, shaft 70 includes a reduced diameter lower drive head 82 that engages with a correspondingly shaped socket 38 formed in the upper end of the brush core 36, as described previously. Thus, the cross-sectional shape of the drive head 82 matches that of the socket 38, the shape of which may be square, hexagonal, octagonal, etc. The end of the drive head 38 bears against the bottom of the socket 38.

It will be appreciated that the drive sprocket 78 drives the chain 76, which in turn causes the brushes 12 to spin about their central axis 14. Further, the rotational speed at which the brushes 12 spin can be independent of the speed at which the powered shaft 62 rotates the carrier assembly 16 causing the brushes 12 to revolve in the housing 14 about the central axis 60 of the housing.

Referring specifically to FIGS. 1, 3, and 5, the lower carrier substructure 56 includes a lower annular ring 84 that is positioned above the bottom floor 86 of the housing 14. The lower annular ring 84 is tied to the upper annular ring 58 by tie rods 88 that extend vertically between the upper and lower annular rings 58 and 84. A tie rod 88 is shown as positioned adjacent the end of each spoke 64; however, the tie rods 88 can be located elsewhere about the upper and lower rings, and a larger or fewer number of tie rods could be utilized. Preferably the tie rods 88 are positioned between adjacent brushes 12 so as not to interfere with the flow direction of cleaning fluid or other fluids discharged from central nozzles described below. It will be appreciated that through the use of the tie rods 88, the lower annular ring 84 rotates in concert with the upper annular ring 58 so as to hold the brushes 12 securely between the upper and lower annular rings.

The lower annular ring 84 is maintained in registry directly below the upper annular ring 58 by the use of centering rollers 89 that are mounted to the upper end of studs 90 extending upwardly from housing floor 86. The centering rollers 89 roll against the inside diameter 91 of the lower annular ring 84. Although eight centering rollers 89 are illustrated in FIG. 2, a larger number or a fewer number of centering rings may be utilized. Also, other techniques may be employed to maintain the lower center ring 84 centered relative to upper annular ring 58 and rotational axis 60.

Referring to FIG. 5, the lower end portions of the brushes 12 are connected to the lower annular ring 84 via a quick disconnect mounting assembly 92 carried by the lower annular ring 84. The mounting assembly 92 is fully described and illustrated in U.S. patent application Ser. No. 14/970,129, filed Dec. 15, 2015, and incorporated in its entirety into this application. The mounting assembly 92 is secured to the lower annular ring 84 by mounting flange 92*a* that overlies the upper surface of the annular ring 84. Hardware (now shown) attaches the flange 92*a* to the annular ring 84. A through hole 93 is formed in the annular ring 82 to provide clearance for the housing portion 94 of the mounting assembly 92. The mounting assembly 92 receives and supports an idle shaft or pin 96, having an upper end portion engaged into the blind hole 40 formed in the lower end of the brush core 36. The idle pin 96 is resiliently loaded in the upper direction to securely engage within the blind hole 40 and rotatably support the lower end of the brush for rotation about the longitudinal central brush axis 18. Because the idle shaft 96 is resiliently biased in the upward direction, it can be retracted in the downward direction by simply pushing downwardly on the brush 12. The brush 12 is loaded into the washing machine 10 by placing the blind hole 40 over the upper end of the idle shaft 96 and pressing downwardly on the brush to provide clearance between the upper end of the brush and the bottom of the drive head 82. Next, the square socket 38 need only be aligned with the drive head 82 and allowed to engage upwardly over the drive head under the action of the resiliently loaded idle shaft 96.

It will be appreciated that the brushes 12 may be removed from the washing machine 10 by simply reversing the foregoing procedure. In this regard, the brush 12 is simply pressed downwardly causing the idle shaft 96 to move downwardly relative to mounting assembly 93 until the upper end of the brush 12 clears the bottom of the drive head 82 at the upper annular ring 58. Once the upper end of the brush 12 has cleared the drive head 82, the downward pressure on the brush 12 can be released so that the brush can simply be lifted off of and away from the idle shaft 96 and thereby is free to be removed from the washing machine 10.

Referring to FIG. 3, the interior of the housing 14, inward of brushes 12, is divided into separate zones where at specific steps of the cleaning/sterilizing process occur. Such zones 20, 22, 24, 26 are shown in FIG. 3 and described below. These zones are defined by partition walls 100 that radiate out from the center of the housing. Although four zones are illustrated in FIG. 3, a fewer number or larger number of zones may be formed within the housing.

Referring to the zones shown in FIG. 3, zone 20, the first zone in the cleaning process directs water for rinsing or soaking to the brushes to loosen up the dirt, grease, and/or other debris or other matter lodged in the brush bristles. The water can be applied at ambient temperature or could be heated to an appropriate temperature depending on, for example, the nature of the dirt, debris, and other substantially removed from the brushes. The rinse/soaking water may be applied to the brushes by a series of vertically spaced nozzles 102. The nozzles 102 are connected to a source of water or other liquid, and appropriate valves and controllers are provided to control the application of the rinse or soaking water or other liquid to the brushes as well as the heating of the water, if it is heated. It will be appreciated that while in zone 20, the brushes 12 are moving the inside perimeter of the housing about central axis 60 and also individually spinning about their longitudinal central axis 18 thereby to present the entire surface area of the brushes to the spray from nozzle 102. This relative motion occurs in each of the zones of the washing machine 10.

In the next zone 22, a cleaning solution, for example, a foam detergent, may be sprayed on the brushes 12 by nozzles 104, thereby to break down the dirt, debris, particulate matter, grease, other foreign materials, etc., from the brushes. Again, as described above, due to the construction of washing machine 10, the entire surface area of the brushes 12 is presented to the nozzle 104 several times during the interval that the brushes 12 revolve through the second zone 22.

In the next zone 24, spray at applicable pressure and/or volume is applied to the brush to remove the loosened dirt, debris, grease, particulate matter, foreign materials, etc. For some types of brushes, the pressure of the spray needs to be limited so as not to damage the brushes. The spray is applied to the brushes by nozzles 106 which are connected to a source of spray that may be in the form of water, air or a combination thereof. The spray from the nozzles 106 drains off of the brushes 12 to the collection tank 30 at the bottom of the housing. The same is true for the water or other liquid from zone 20 as well as the foam or other cleanser that does not remain on the brushes in zone 22. The drainage from the zones 20, 22, and 24 may be collected in a singular tank 30, or the tank 30 can be divided into sections so that the drainage from each zone is kept separate. The drainage liquid can be processed and reused again in the brush washing machine 10.

In the next zone 26, the brushes are sanitized with a sanitizing spray applied to the brushes by nozzles 108. The sanitizing spray may consist of an alcohol-water solution, a peracetic acid solution or similar/equivalent solution or mixture.

Prior to applying the sanitizing spray, the brushes may be at least partially dried by applying, for example, ambient air and/or heated air to the brushes utilizing nozzles (not shown) located in zone 26 upstream from nozzles 100, and/or in a separate zone upstream from zone 26. Further, in addition to a sanitizing spray, the brushes 12 may be subjected to ultraviolet light to kill bacteria that may remain on the brushes. The ultraviolet light may be applied to the brushes in zone 26 and/or in a separate zone.

Water and other fluids, detergents, air (in selected pressures and/or volumes and/or temperatures), disinfectants, sanitizing agents, etc. can be routed to the interiors of the machine 10 and to nozzles, such as nozzles 102, 104, 106, and 108 by inlet ports 110, 112, 114, 116, 118, and 119 shown in FIG. 1. These ports can be connected to the source(s) of the applicable processing/cleaning liquids, detergents, fluids, etc.

The washing machine 10 can be programmed to repeat the process of one or more of the above-described zones multiple times while the brushes are within the washing machine 10. For example, the brushes may cycle through zones 20, 22, and 24 two or more times before the brushes are dried and/or sanitized in zone as described above.

The programming of the washing machine 10 so as to subject the brushes to a desired washing cycle can be inputted by the user interface on the control panel 32.

In operation, the brushes 12 are mounted within the washing machine 10 by opening the door 50, thereby to provide access to the interior of the housing through opening 52. As described above, the brushes 12 can be conveniently positioned in the housing by inserting the blind hole 40 at the bottom of a brush over the idler shaft 16 and pressing downwardly on the idler shaft so as to retract the idler shaft, thereby to provide clearance at the top of the brush to permit alignment of the upper socket 38 with the drive head 82. Thereupon, the brush head 12 is simply released and the idler shaft 96 presses upwardly against the brush to securely seat the upper end of the brush with the drive head.

The upper and lower carrier substructures, 54 and 56 index (rotate) in unison to present the next brush mounting station to the opening 52 in the housing. Once the machine 10 is fully loaded, the door 50 is closed and the machine programmed to a desired cleaning and sanitation cycles. Thereafter, the brushes 12 are conveniently removed from the washing machine by reversing the foregoing process. While within the washing machine, the brushes 12 are thoroughly cleaned and sanitized in an efficient uniform manner. By spinning the individual brushes 12 about their longitudinal axes 18 at a relatively fast speed, the entire outer surface of the brushes are presented to the nozzles 102, 104, 106, and 108 at least several times while the brushes are within each of the processing zones 20, 22, 24, and 26. The speed that the brushes are spun can be independently controlled by controlling the speed of the drive shaft 80 which powers the drive sprocket 88.

Figure 4:
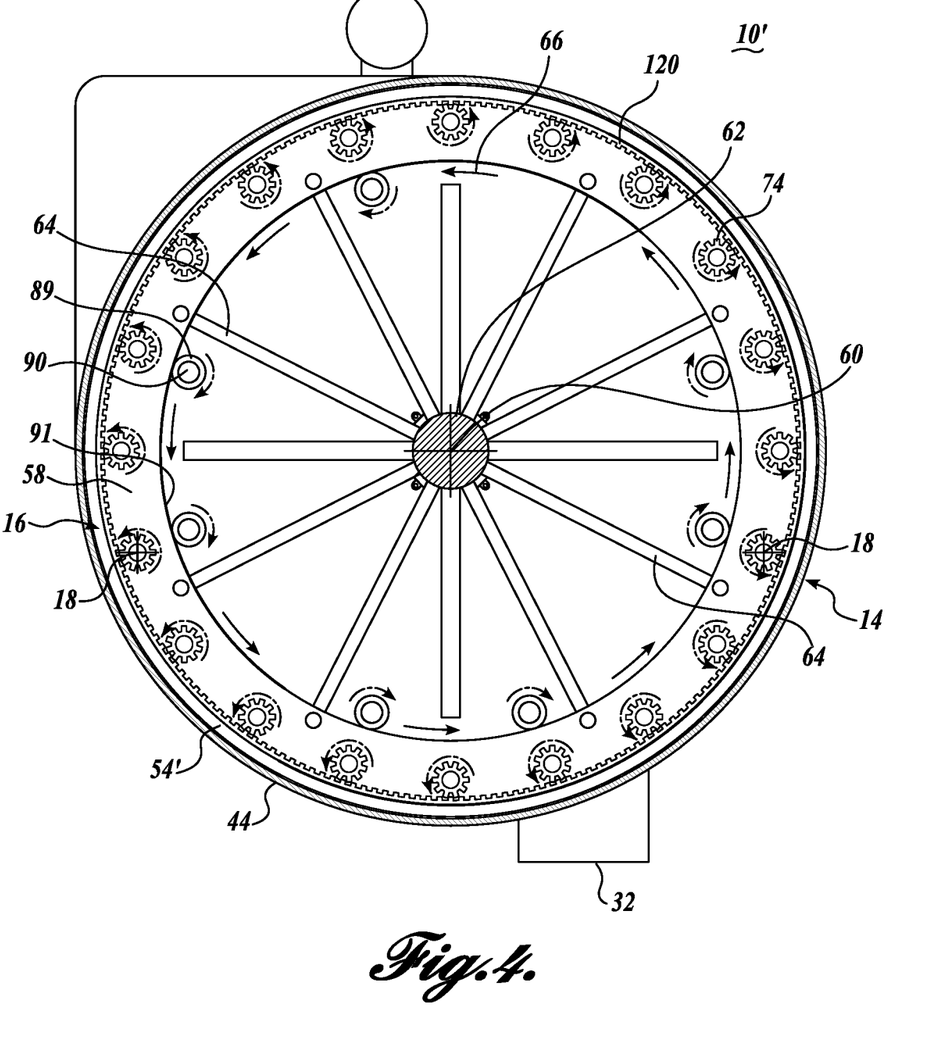
FIG. 4 is a cross-sectional view similar to FIG. 2 showing another embodiment of the present disclosure.

A further embodiment of the present disclosure is shown in FIG. 4. The components of the illustrated washing machine 10' that are the same as in the washing machine 10 are identified by the same part numbers. The description of those components will not be repeated here so as to avoid duplication or repetition. FIG. 4 corresponds to FIG. 2 above. In this regard, the washing machine 10' is constructed similar to washing machine 10, except for the manner in which the sprockets 74 are driven. Rather than being driven by an external chain, the sprockets 74 mesh with a stationary ring gear 120. As a result, as the carrier assembly 16 is rotated, the brushes 12 are also rotated by the engagement of the sprockets 74 with the ring gear 120. In this arrangement, the speed at which the brushes 12 rotate about their individual longitudinal axes 18 is dependent on the speed at which the upper and lower annular rings 58 and 84 are rotated. Thus the speed at which the brushes 12 spin about their longitudinal axis 18 is a proportional to the speed that the powered shaft 62 rotates. Of course, by changing the size of the sprockets 74, the relative spinning speed of the brushes can be altered. Nonetheless, the spinning speed of the brushes about their individual longitudinal axes 18 is sufficiently fast so that several spinning revolutions of the brushes will occur during travel of the brushes through each of the processing zones 20, 22, 24, and 26. Other than the foregoing, the construction and the operation of the washing machine 10' is the same or very similar to washing machine 10 described above.

Figure 6:
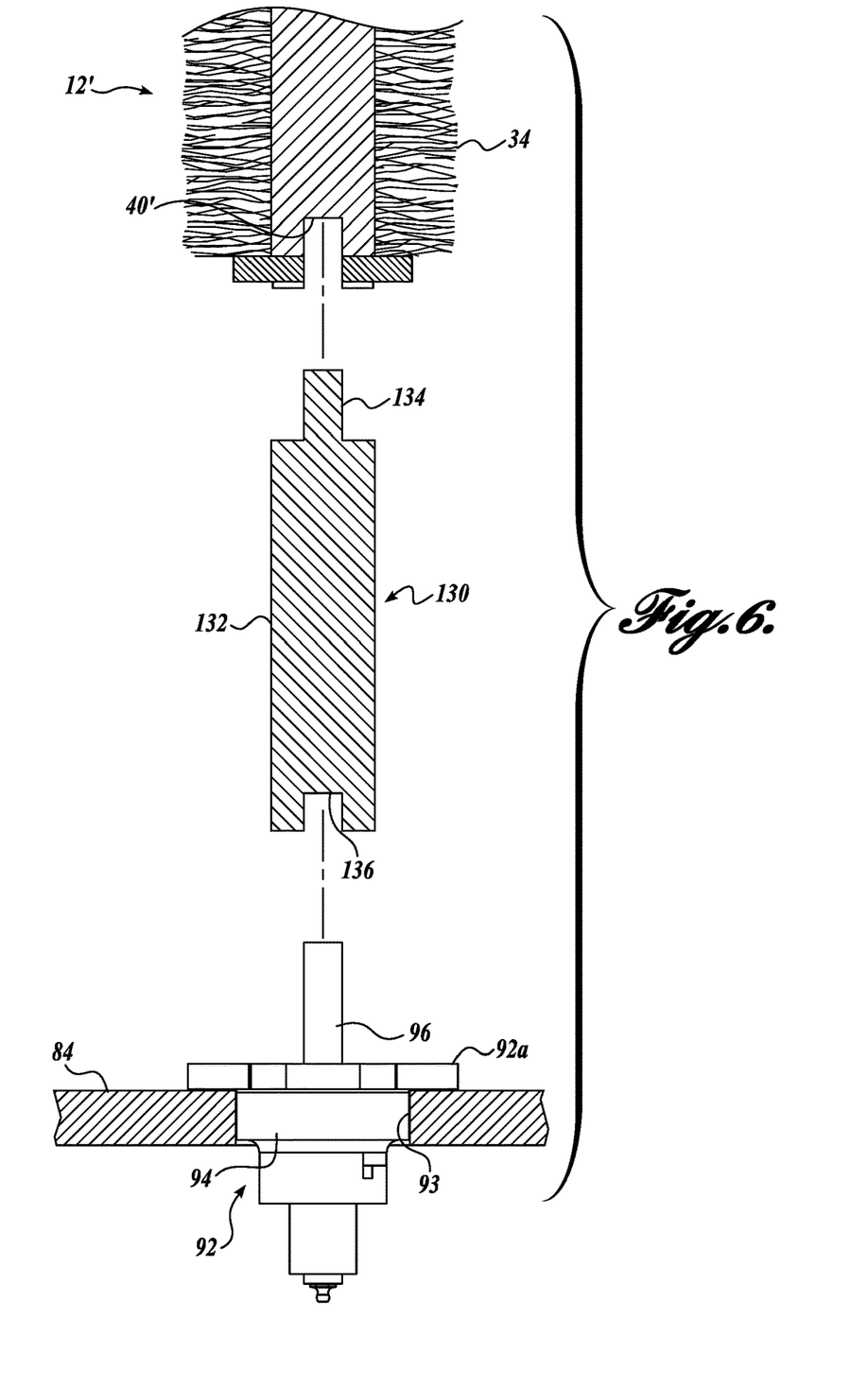
FIG. 6 is an enlarged fragmentary view of the engagement of the lower end of a brush with the washing machine apparatus.

A further embodiment of the present disclosure is shown in FIG. 6. The components of the illustrated washing machine that are the same as in the washing machine 10 shown in FIG. 5 are identified by the same part numbers. The description of those components will not be repeated here so as to avoid duplication or repetition. FIG. 6 corresponds to FIG. 5 above. In this regard, the washing machine is constructed similarly to washing machine, but with an adapter 130 for cleaning brushes 12' that are shorter than brushes 12 shown in FIG. 5. As shown in FIG. 6, the adapter 130 is utilized so that the same washing machine can be used with brushes of different lengths. The adapter 130 is in the form of an extension rod 132 having a pin 134 extending upwardly from the upper end of the rod 132 to engage within blind hole 40' of the brush 12' in the same manner that idle shaft 96 extends into the blind hole 40 of the brush 12 shown in FIG. 5.

The rod 132 is illustrated as being of solid construction, but the rod can be of hollow construction to reduce its weight. Also the rod can be formed from various materials including corrosion resistant metals or high strength plastics. At the lower end, a blind bore 136 is provided for reception of the idle shaft 96. It can be appreciated that adapter 130 can conveniently be engaged with the lower end of the brush 12' and then the combined brush and adapter loaded onto the washing machine in the same manner as described above with respect to brush 12. Other than the use of the adapter 130, the brush 12' is cleaned and sanitized in the same manner as brush 12 described above.

Figure 7:
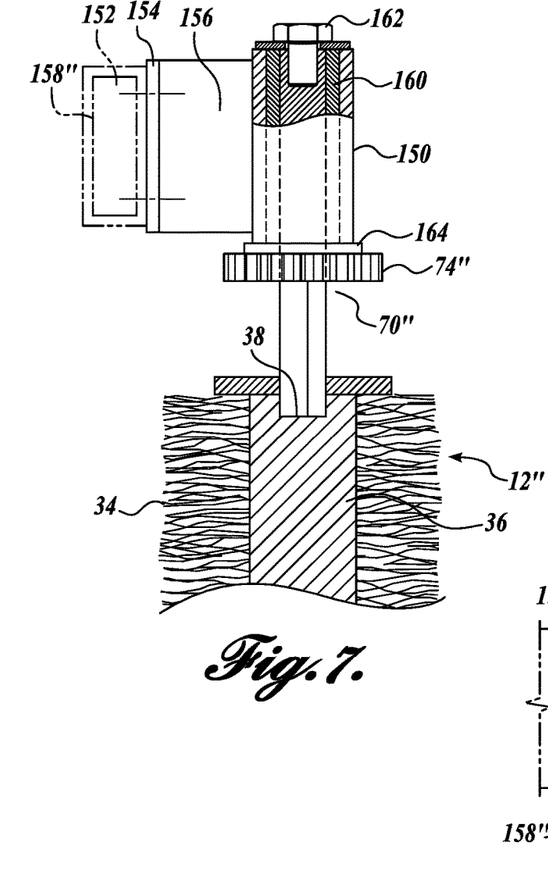
Figure 8:
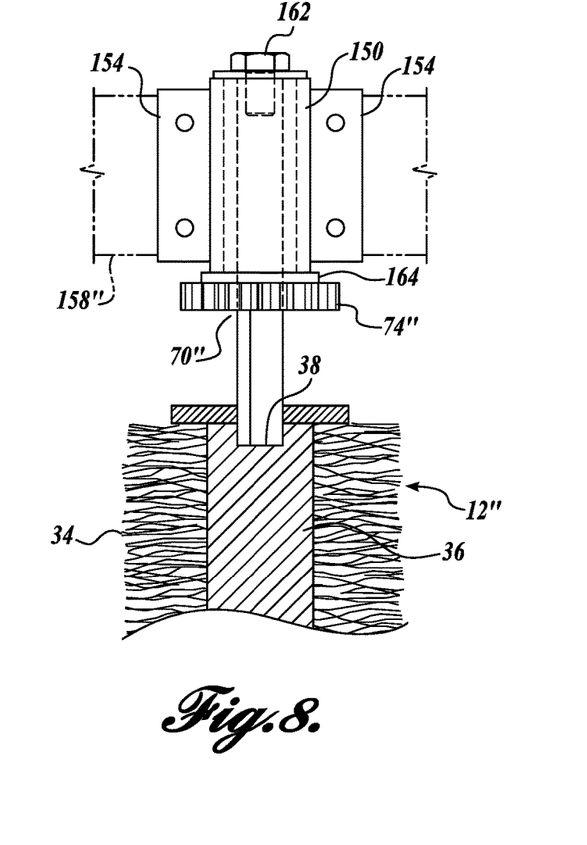

A further embodiment of the present disclosure is shown in FIGS. 7 and 8. The components of the illustrated washing machine that are the same as the washing machines described above wherein like parts are identified by the same part numbers. The description of these components will not be repeated here. FIGS. 7 and 8 are directed to an alternative mounting and drive arrangement for the upper end of brushes 12". As shown in FIGS. 7 and 8, a drive shaft 70" is disposed within a mounting collar 150, which in turn is attached to mounting bracket 152. The bracket 152 includes opposed mounting flange portions 154 and curved central portion 156 that is welded or otherwise attached to the collar 150. The flanges 154 are connectable to upper annular ring structure 158. Such ring structure may be of hollow or partially hollow construction so as to reduce the weight thereof. The ring structure 158 functions the same or very similarly to the upper annular ring 58 described above.

A bushing, such as a bronze bushing 160, is interposed between shaft 70" and collar 150. Also, a hardware member in the form of a nut 162 is engaged with the threaded blind hole in the upper end portion of the shaft 70" to retain the shaft 70" engaged with the collar 150. A bronze thrust washer 164 is positioned between the underside of the collar 150 and the chain sprocket 74". The sprocket 74" is held stationary with respect to the shaft 70" by any convenient means, for example, using a key and keyway, shaping the shaft 70" with a flat or in a square or hexagonal cross section to correspond with the shape of the inside diameter of the sprocket 74". Below the sprocket 74", the shaft 70 is square in cross section to match the socket 38 formed in the upper end portion of the brush core 36.

In terms of operation, the embodiment of the present disclosure shown in FIGS. 7 and 8 is the same as described above, including with respect to FIG. 5.

While illustrative embodiments have been illustrated and described, it will be appreciated that various changes can be made therein without departing from the spirit and scope of the invention. For example, the lower annular ring 84 may be constructed differently than described above. In this regard, the powered shaft 62 may be extended downwardly to the elevation of the lower annular ring 84, and the shaft attached to the annular ring using spokes similar to the spokes 64 employed to attach the upper annular ring 58 to the drive shaft 62. In this alternative construction, the nozzles 102-108 may be located outwardly of the brushes 12 when mounted within the washing machine 10. For example, such nozzles may extend inwardly toward axis 60 from manifolds (not shown) extending upwardly along the interior wall of the housing body 44.

As another alternative, rather than mounting the nozzles outwardly of the brushes 12, the nozzles 102-108 may be located as shown in FIG. 3. The heated water, detergents, pressurized air, sanitizing agents, etc. may be routed to the nozzles 102-108 by the use of a multi-channel rotary manifold extending upwardly or downwardly through the center of the housing body to allow the spray into the four zones 20, 22, 24, and 26 with at least four different media.

Further, in place of the carrier assembly 16 described above, the brushes 12 may be carried about the interior housing by a belt or a chain riding in a track system. Appropriate brackets could be attached to the belt/chain to engage with the upper and lower ends of the brushes. Further, a separate chain system, similar to that illustrated in FIG. 2, can be used to rotate the brushes 12 about their individual axis 18 independently of the speed at which the brushes revolve around the interior of the housing. This configuration of carrier assembly could be utilized regardless of the shape of the housing.

Although separate zones have been identified above whereat specific steps of the cleaning/sterilization process may occur, the described zones are examples of zones that can be used in conjunction with the washing machine 10. Other zones in addition to those specifically described above may be utilized for additional steps, in the endeavor to clean, sanitize, and/or dry the brushes 12 in an energy and time efficient manner without creation of undue waste fluids and liquids.

Moreover, the washing machine 10 can be constructed with multiple zones, which are the same or similar. For example, in certain situations, it may be desirable to utilize two rinse/soaking zones adjacent each other or spaced from each other. The same is true for the other zones described above.

The embodiments of the invention in which an exclusive property or privilege is claimed are defined as follows:

1. A method for removing particulate matter from rotary brushes, comprising:
  (a) revolving the rotary brushes along a path about a housing;
  (b) simultaneously spinning the rotary brushes about the longitudinal axis of the individual rotary brushes;
  (c) during the revolving of the rotary brushes along a path about the housing and the individual simultaneous spinning of the rotary brushes about the longitudinal axis of the individual rotary brushes, passing the rotary brushes through a cleaning solution application zone to apply a cleaning solution to the rotary brushes; and (d) during the revolving of the rotary brushes about the housing and the simultaneous spinning of the rotary brushes about the individual longitudinal axes of the rotary brushes, passing the rotary brushes through a spraying zone to apply a spray to the rotary brushes.

2. The method according to claim 1, further comprising during the revolving of the rotary brushes along a path about the housing and the simultaneous spinning of the rotary brushes about the longitudinal axis of the individual rotary brushes, passing the rotary brushes through a wetting zone to apply a wetting fluid to the rotary brushes.

3. The method according to claim 2, further comprising dividing the housing into a wetting zone for applying a wetting fluid to the rotary brushes.

4. The method of claim 1, further comprising during the revolving of the rotary brushes along a path about the housing and the simultaneous spinning of the rotary brushes about the longitudinal axis of the individual rotary brushes, passing the rotary brushes through a sanitizing zone to apply a sanitizing medium to the rotary brushes.

5. The method according to claim 4, further comprising further dividing the housing into a further sanitizing zone for applying a sanitizing medium to the rotary brushes.

6. A method for removing particulate matter when cleaning rotary brushes, comprising:
(a) loading the rotary brushes into a housing;
(b) moving the rotary brushes along a travel path about the housing;
(c) simultaneously spinning the rotary brushes about the longitudinal axis of the individual rotary brushes as the rotary brushes move along the travel path;
(d) applying a cleaning solution to the spinning rotary brushes; and
(e) applying a spray to the spinning rotary brushes.

7. The method according to claim 6, further comprising passing the rotary brushes through a cleaning zone in the housing as the cleaning solution is applied to the spinning rotary brushes.

8. The method according to claim 6, further comprising passing the spinning rotary brushes through a spraying zone in the housing as the spray is applied to the spinning rotary brushes.

9. The method according to claim 6, further comprising applying a wetting fluid to the spinning rotary brushes.

10. The method according to claim 9, further comprising passing the spinning rotary brushes through a wetting zone in the housing as the wetting fluid is applied to the spinning rotary brushes.

11. The method according to claim 6, further comprising applying a sanitizing medium to the spinning rotary brushes.

12. The method of claim 11, further comprising passing the rotary brushes through a sanitation zone in the housing while the sanitizing medium is applied to the spinning rotary brushes.

13. The method according to claim 6, further comprising dividing the housing into separate zones for applying a cleaning solution to the spinning rotary brushes and for applying a spray to the spinning rotary brushes.

14. The method according to claim 13, further comprising dividing the housing into a wetting zone, wherein a wetting fluid is applied to the spinning rotary brushes.

15. The method according to claim 13, further comprising dividing the housing into a sanitizing zone for applying a sanitizing medium to the spinning rotary brushes.

16. The method according to claim 6, wherein the rotary brushes are loaded into a carrier assembly for supporting the rotary brushes for travel about the housing and for simultaneously supporting the rotary brushes for spinning about the rotary axis of the rotary brushes.

17. The method according to claim 16, wherein the rotary brushes are loaded onto the carrier assembly by engaging an end of the rotary brush with a resiliently retractable mounting assembly of the carrier assembly that retracts to receive the end of the rotary brush.

18. The method according to claim 17, wherein after the end of the rotary brush is received by the retractable mounting assembly, engaging the opposite end of the rotary brush with a drive head operable to rotate the rotary brush about its rotational axis.

* * * * *